United States Patent Office 3,684,672
Patented Aug. 15, 1972

3,684,672
PROCESS FOR PAPER MANUFACTURE
Koji Iwahashi, Nagayo-machi, and Kenji Ueda and Kihei Katsuta, Nagasaki, Japan, assignors to Mitsubishi Jukogyo Kabushiki Kaisha, Tokyo, Japan
Filed Aug. 5, 1970, Ser. No. 61,389
Claims priority, application Japan, Aug. 7, 1969, 44/62,474
Int. Cl. C01b 7/02; C01d 7/34; D21c 3/26
U.S. Cl. 204—128          7 Claims

ABSTRACT OF THE DISCLOSURE

Improved kraft paper manufacture is effected by electrolytic removal of chlorine from sodium chloride dust collected in the Cottrell's precipitator installed downstream from a cascade evaporator of the chemical recovery boiler system which processes the pulp cooking liquors for recirculation to the pulp cooking vessel in the kraft paper manufacturing process. The electrolysis of sodium chloride is improved by use of an insoluble anode such as platinum and maintaining electrolyte solution acid by addition of sulfuric acid.

---

Figure 1:
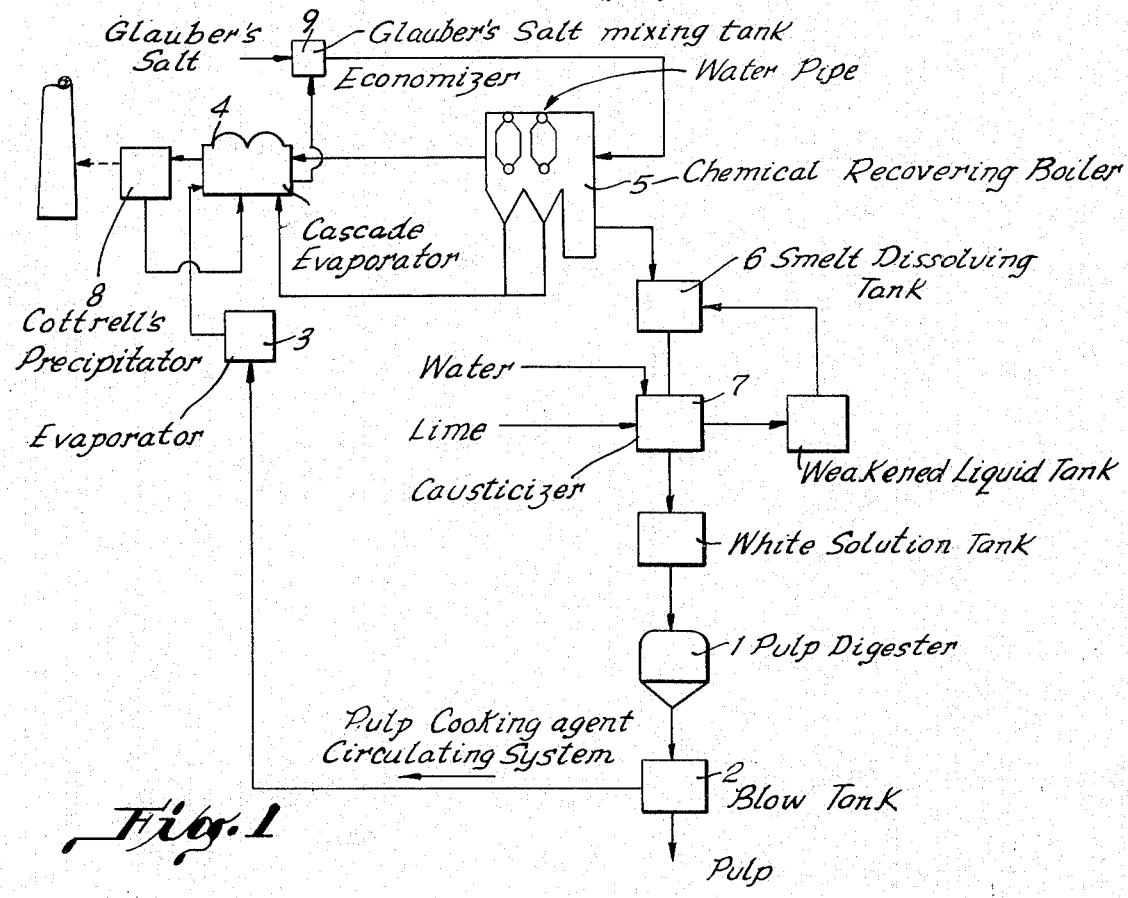

This invention relates to a process for recovering pulp cooking agents, particularly for recovering cooking agents wherein dechlorination can be effectively performed in a recovery boiler system for eliminating various troubles due to NaCl contained in pulp cooking agents, such as reduction of the effective concentration of cooking agents and corrosion occurring in the boiler system.

NaCl accumulates in pulp cooking agents for the following reasons.

The reasons are explained in referring to the drawing:

In FIG. 1, 1 is a pulp digester; 2 is a blow tank for pulp materials; 3 is an evaporator for condensing the waste solution; 4 is a cascade evaporator for condensing further the waste solution condensed in the evaporator 3; 5 is a chemical recovering boiler; 6 is a smelt dissolving tank; 7 is a causticizer; 8 is a Cottrell's precipitator installed in a flue of the boiler; and 9 is a Glauber's salt mixing tank.

Usually, pulp cooking agents are supplied to the digester 1, and then circulated through the blow tank 2, the evaporator 3, the cascade evaporator 4, the boiler 5, the smelt dissolving tank 6, and the causticizer 9, in this order.

Though a part of the agents entrains out of the flue as dust, almost all of them are recovered by the Cottrell's precipitator 8 to return to the cascade evaporator 4, and the waste solution condensed in the cascade evaporator 4, is mixed with Glauber's salt in the Glauber's salt mixing tank 9, and then sent to the boiler 5 to be burnt.

The raw woods for pulp are imported from various countries over the world in this industry; these imported woods, after being cut in forests, are preserved in sea water, before being sent for chipping in a pulping factory, consequently, sea water penetrates into the woods and NaCl elutes into the pulp cooking agents during the pulp cooking process. Furthermore, in such agents, chlorine existing as impurities in the agents or replenished agents added for the removal of smoke from the flue of a recovery boiler is accumulated and circulated through the pulp cooking chemical system.

Such NaCl not only reduces the effective concentration of cooking agents in pulp cooking, but also causes corrosion of some parts of Cottrell's precipitator or of superheater conduits increases the danger of explosion in the smelt dissolving tank, and makes the ashes that are apt to adhere to the boiler more viscous; the corrosion of the low-temperatured parts of the boiler is also adversely subjected to severe corrosion. Thus, NaCl is harmful to pulp agents.

Pulp cooking agents are, as previously described, charged into the digester 1, and then used repeatedly in its circulation through the boiler system; therefore, accumulation of NaCl in the said agents cannot be avoided unless it is removed.

For eliminating the above-described various troubles, a process for dechlorination of cooking agents has been investigated.

The present invention presents a process for the recovery of pulp cooking agents which serves for the above purpose: one of its processes is characterized in the removal of chlorine from the NaCl contained in the dust collected by a Cottrell's precipitator settled in the flue of a recovery boiler in the pulp cooking agent recovering boiler system. The said process is explained below.

The following are the explanations for the use of Cottrell's precipitator dust in the dechlorination of NaCl contained in the dusts: when chlorine is removed, for example, by an electrolysis process, the dechlorination effect depends greatly on the place from which the dust is collected in the pulp cooking agent circulating system. In the present invention the most effective place is selected from the view point of the electrolyzing condition. The following are the reasons for this selection:

The green solution formed in the smelt dissolving tank 6 shown in FIG. 1, consists mainly of $Na_2CO_3$ and $Na_2S$, and contains some other materials such as $Na_2SO_4$, $Na_2SO_3$, $Na_2S_2O_3$; etc.

The white solution formed in the causticizer 7 consists mainly of $Na_2S$; its other components are similar to those of the green one. The pulp cooking waste solution system (the black solution system) from the blow tank 2 to the recovering boiler contains the residual white solution components for cooking, as well as the organic eluates such as lignin. They are the main systems in the pulp cooking agent circulating system through cooking to recovery, but none of them are suitable for the dechlorination treatment by the electrolysis of NaCl for the following reasons:

(a) As the liquid is alkaline, $Cl_2$ formed in the NaCl electrolysis is again absorbed by the electrolyte, and the separation effect of $Cl_2$ is greatly reduced; consequently, the "membrane method" or the "mercury method," well known as the electrolytic soda process, is required, but it results in the use of trouble-some devices and operations.

(b) $Na_2S$ existing in the solution disturbs the electrolysis of NaCl. In the green and white solutions, there is more $Na_2S$ than NaCl, so that the dechlorination of NaCl by electrolysis is difficult.

(c) For separating the $Cl_2$ generated by electrolysis, from the solution, it is preferred that the pH of the solution is acidic; however, the above-described circulating agents are all alkaline. Changing the nature of solution to be acidic is uneconomical and results in the great disturbance of balance in the system of circulating agents.

(d) In the process for returning to the black solution system through a hopper or a Cottrell's precipitator from a flue of a recovery boiler, the main components of the agents are $Na_2CO_3$ and $Na_2SO_4$ in the upstream region of the flue, and various impurities are carried over therein. In the downstream region of the flue, $Na_2SO_4$ is the main component, and particularly in the dust collected by the Cottrell's precipitator, the ratio of $Na_2SO_4/Na_2CO_3$ becomes large; consequently the solution can be turned acidic satisfactorily with a small amount of acid.

(e) Seeing from the distribution of NaCl in the above circulating agent system, NaCl accumulates mostly in the parts including flue-Cottrell's precipitator-black solution system, and ratio of Cl/Na$_2$O is the largest in the dust collected by a Cottrell's precipitator.

The following is an example:

The ratio of Cl/Na$_2$O in the combustion ashes of the recovery boiler is 0.073; that of the green liquor is 0.058; and that of the white liquor is 0.057. On the contrary, that of the ashes of an economizer of a boiler is 0.077, and that of the dust collected by a Cottrell's precipitator is as much as 0.156.

Depending on the reasons above, the dusts, particularly the dust collected by a Cottrell's precipitator, are advantageously used for dechlorination treatment, and the present invention is based on this fact.

As described above, the NaCl concentration in the dust collected in a Cottrell's precipitator is the highest among the chemical circulating system; so that by removing the Cl content in NaCl in this stage effective concentration of cooking agents can be increased, in the prevention of corrosion of some parts of Cottrell's precipitator and superheater in a recovery boiler can be decreased of the danger of explosion in a smelt dissolving tank, and the adhesiveness of ashes adhering to the boiler can be lowered.

Also advantageously, as the dust collected by a Cottrell's precipitator has the largest ratio of $$Na_2SO_4/Na_2CO_3$$

in using an electrolysis process for removing Cl from the NaCl content, the liquor can advantageously be turned to acid with the least amount of an acid.

Another advantage is that Na is supplied to the cooking agents by returning the Cl-removed dust to the inlet of a cascade evaporator.

The second process of the present invention is for the recovery of pulp cooking agents, characterized, in the pulp cooking chemical recovering boiler system, by the dissolution of a part of the dust collected by a Cottrell's precipitator, installed in the flue of a recovery boiler in the water, after adding sulfuric acid to make the solution acidic, electrolyzing at an insoluble anode as always keeping the solution in an acidic condition by sulfuric acid, and after removing chlorine ions as chlorine gas, returning the said treated solution to the inlet of a cascade evaporator attached to the above recovering boiler. This process is explained below more precisely.

Carbon electrodes are usually employed in the process for obtaining caustic soda and chlorine by NaCl electrolysis in the electrolytic soda industry. It depends on the following reaction:

$$2NaCl+H_2O \rightarrow 2HaOH+Cl_2\uparrow+H_2\uparrow$$

For removing Cl$_2$, a special device such as the "mercury electrolyzer" or "membrane electrolyzer" is required.

These devices are, however, not suitable for the dechlorination treatment in a recovery boiler, because they involve various complicated operations, although the amount to be treated is small.

In the process of this invention, chlorine is removed by a simple NaCl electrolysis, wherein NaCl is electrolyzed in an acidic condition, using platinum, titanium plated with platinum, or lead dioxide as the insoluble anode; although this a very effective dechlorination process for a pulp cooking agent system, from the point of view of the device and the amount to be treated; however, it is not suitable for a general NaCl electrolysis, because the NaCl must be refined in a general NaCl electrolysis. Particularly, the SO$_4$—must be removed by pre-treatment, as it causes consumption of carbon electrodes. One of the outstanding characteristics of the electrolysis of the present invention, on the contrary, is the performance of electrolysis in the presence of a large amount of Na$_2$SO$_4$ in the acidic H$_2$SO$_4$.

The following are the reasons why H$_2$SO$_4$ is used here:

If the dust collected by a Cottrell's precipitator is electrolyzed as it is dissolved in water, that is, in an alkaline condition, the reaction represented by the following Formula A occurs, and Cl$_2$ is absorbed into the liquid:

$$NaCl+H_2O \rightarrow NaClO+H_2\uparrow \quad (A)$$

Cl$_2$ is not separated, because the Cl$_2$ generated is absorbed into the liquid as seen in Formula B:

$$Cl_2+H_2O \rightleftharpoons HClO+Cl^-+H^+ \quad (B)$$

When adding H$_2$SO$_4$ to the above system, H$^+$ ions are formed, and the equilibrium of the Formula B is affected and reaction proceeds from the right column to the left column, so that Cl$_2$ is separated.

As described above, by adjusting the liquid to be acidic with H$_2$SO$_4$, the Cl$_2$ generated by electrolysis can be separated more easily, without such a complicated electrolyzer used in the electrolyzing soda industry as described previously. Also the H$_2$SO$_4$ added is used as sulfur charging, and consequently, the balance of the chemical recovering system can be advantageously kept. In the chemical recovering system, Na$_2$SO$_4$ is added to supply S and Na, but the amount of H$_2$SO$_4$ to be added can be kept within the amount of SO$_4$—in the said Na$_2$SO$_4$; simultaneously, the NaOH formed by electrolysis serves as Na supplier, and the Cl$_2$ generated can be used for pulp bleaching.

Cl$_2$ introduced to the cooling water tube system of a recovery boiler prevents ocean creatures from adhering to said tube system.

The addition of H$_2$SO$_4$ is substantially similar to the supply of Na$_2$SO$_4$, and the cost of 98% H$_2$SO$_4$ is $0.025/kg., which is economically advantageous as compared with the cost of Na$_2$SO$_4$, $0.044/kg.

Some examples of pulp cooking agents are shown below:

In a case where the weight ratio of Na$_2$CO$_3$/Na$_2$SO$_4$ in the dust at the outlet of a Cottrell's precipitator is 0.2, and where the NaCl content is 5%, the composition of ash per 1 kg. of the collected dust is as follows:

Na$_2$SO$_4$ 792 g.=5.58 mol/kg.—ash
Na$_2$CO$_3$ 158 g.=149 mol/kg.—ash
NaCl 50 g.=0.86 mol/kg.—ash The amount of H$_2$SO$_4$ required for neutralization is 1.49 mol/kg.—ash, and the amount of H$_2$SO$_4$ required for neutralization is 0.43 mol/kg.—ash; the total is 1.92 mol/kg.—ash.

In the case of a recovery boiler having the capacity of 350 ton pulp/day, presuming to supply Na$_2$SO$_4$ with a rate of 80 kg./t.-pulp, it corresponds to the supplying amount of Na$_2$SO$_4$ of 8.22 kg.-mol/h.; consequently, the ash can be treated with the rate of 4280 kg./h. Presuming the NaCl content to be 5% as described above, the above value corresponds to 214 kg./NaCl/h.

The value explained previously is an example of the maximum amount treated by the process of this invention, and the said value varies depending on the composition of ash such as NaCl content.

In practice, the accumulating rate of NaCl in a chemical system in a recovery boiler is not so large, so that there is no need to provide such large equipment; and it will be sufficient if the capacity of equipment is a little larger than the rate of accumulation. Thus, the supplying amount of Na$_2$SO$_4$ is reduced by an amount corresponding to H$_2$SO$_4$ used in dechlorination.

As described above, the added H$_2$SO$_4$ never affects adversely the chemical system, but it serves to reduce the costs of H$_2$SO$_4$ and Na$_2$SO$_4$. (98% H$_2$SO$_4$: $0.025/kg., Na$_2$SO$_4$: $0.044/kg.)

TABLE 1

| Treating liquor | Concentration of NaCl | | Dechlorination ratio (percent) | Current efficiency (percent) | Consumed power (w./h.) |
|---|---|---|---|---|---|
| | Before test NaCl (g./l.) | After test NaCl (g./l.) | | | |
| No. 1: NaCl 3%, 1 l. plus conc. $H_2SO_4$ 15 cc | 32.2 | 23.5 | 26.9 | 26.6 | 3.3 |
| No. 2: NaCl 3%, 1 l. plus $Na_2SO_4$ 100 g. plus conc. $H_2SO_4$ 15 cc | 32.2 | 20.2 | 37.1 | 36.7 | 3.3 |
| No. 3: 3% NaCl, water 1 l. plus $Na_2SO_4$ 200 g. plus $H_2SO_4$ 15 cc | 32.2 | 14.9 | 53.3 | 53 | 3.3 |

Table 1 shows an example of the results obtained in NaCl electrolysis in a laboratory. The anode was Pt spiral wire, and the cathode was Fe network. From these results in Table 1, in the case of No. 3, dechlorination ratio in an acidic condition was 53.5% and the current efficiency was 53%. The current efficiency may be further increased if an electrolyzer is designed adequately.

It is noticed here that, when electrolyzing NaCl under an $H_2SO_4$ acidic condition the current efficiency is improved by the addition of $Na_2SO_4$ compared to the case of NaCl alone. It may be due to the fact that $Na_2SO_4$ serves to reduce the overvoltage of Cl.

The above fact is advantageous to the process of this invention, because the dust collected by a Cottrell's precipitator mare mostly returned to the cascade evaporator as it is, but one part is returned to the cascade evaporator after being treated by the process of this invention, that is, to the waste liquor condensing line, and for this purpose, the concentration of the treated liquor is desired to be as high as possible. It is the same for an electrolyzer.

According to the present invention, it is indispensable to electrolyze when there is a coexistence of $Na_2SO_4$ and NaCl and the concentration of $Na_2SO_4$ is much higher than that of NaCl. It has been recognized that dechlorination can be effectively performed by electrolysis under the condition described above.

Figure 2:
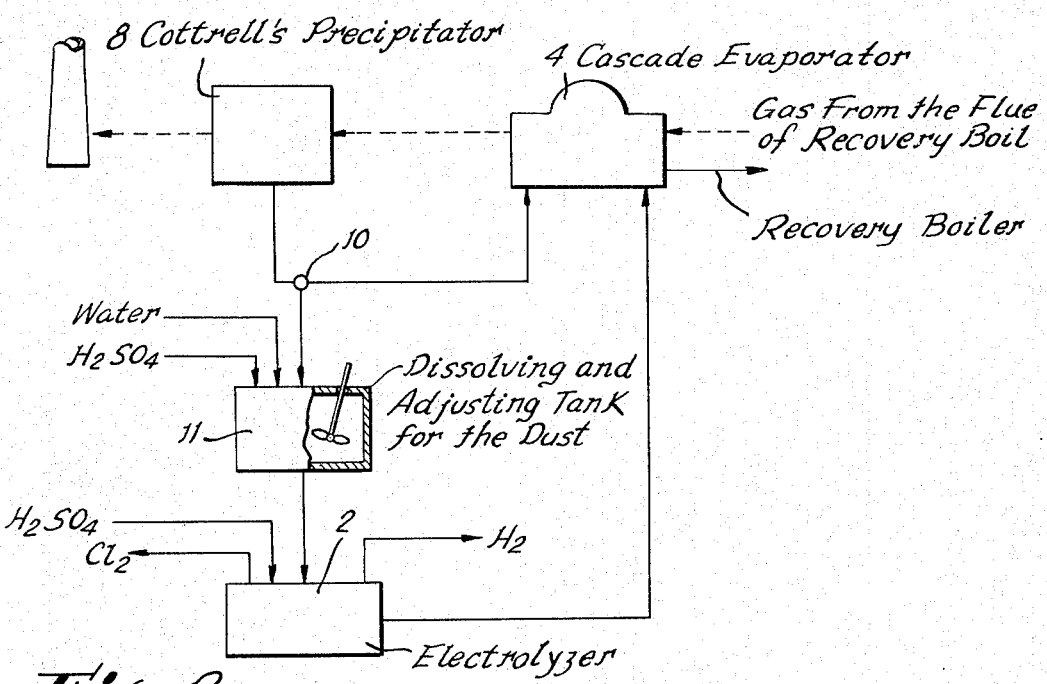

Here the performance of the present invention is explained: In FIG. 2, 4 and 8 are a cascade evaporator and a Cottrell's precipitator, respectively; 10 is an outlet for the dust collected by the Cottrell's precipitator, installed in a pipe line connecting the Cottrell's precipitator 8 with the cascade evaporator 4; 11 is a dissolving and adjusting tank for the dust taken out of the dust outlet 10; 12 is an electrolyzer of the dust solution adjusted in the dissolving and adjusting tank 11, and the electrolyzer is provided with an insoluble anode made of such as platinum and an iron cathode, though they are not shown in the figure.

The dust, which is taken out of the outlet for the dust collected by the Cottrell's precipitator in the above system, is introduced to the dust dissolving and adjusting tank 11 to be dissolved in water, and after adding $H_2SO_4$ to make the solution acidic, it is charged to the electrolyzer 12 and electrolyzed to remove $Cl_2$.

$H_2SO_4$ may be excessively added to the dust dissolving and adjusting tank 11 in order to maintain the solution in acidic condition during electrolysis operation, but it may be charged to the dissolving and adjusting tank to make the solution slightly acidic and then to the electrolyzer 12 in order to maintain the acidic condition during electrolysis operation.

The solution subjected to dechlorination treatment in the electrolyzer 12 is returned to the cascade evaporator 4 through the pipeline, and circulated through the chemical recovery boiler system.

Thus, chlorine can be removed from the recovered agents by taking out and continuously electrolyzing a portion of the dust collected in the Cottrell's precipitator.

What is claimed is:

1. Process for recovering pulp cooking agents in a pulp cooking agent recovery boiler system having a cascade evaporator combined with the recovery boiler and a Cottrell's precipitator installed in the flue of the recovery boiler, which comprises
   (a) removing chlorine from the sodium chloride contained in the dust collected in a Cottrell's precipitator installed in the flue of the recovery boiler, and
   (b) returning the dust from which chlorine is removed to the inlet of the cascade evaporator combined with said recovery boiler.

2. The process of claim 1 employing a pulp cooking agent recovery boiler system having a cascade evaporator for treatment of gas from the flue of said system and a Cottrell's precipitator located downstream of said cascade evaporator, which comprises the process steps:
   (a) removing chlorine by treatment of the sodium chloride contained in the dust collected by said Cottrell's precipitator installed in the flue of said recovery boiler downstream of said cascade evaporator,
   (b) returning said dust from which chlorine is so removed to an inlet of said cascade evaporator, and
   (c) thereafter withdrawing the pulp cooking agents from the cascade evaporator to the recovery boiler from which said pulp cooking agents are reintroduced into paper processing vessels.

3. The improved pulp cooking agent recovery process of claim 2, further characterized in that a part of the sodium chloride containing dust collected by said Cottrell's precipitator installed in the flue of said recovery boiler is dissolved first in water, after adding sulfuric acid to make the solution acidic, and thereafter the said acidified solution is electrolyzed thereby generating chlorine gas which is removed therefrom at the anode.

4. The process of claim 3, further characterized in that the electrolyzing step is carried out with an insoluble anode in acid medium.

5. The process of claim 4, further characterized in that said anode consists of a member selected from the group consisting of platinum, titanium plated with platinum, and lead dioxide.

6. The process of claim 4, further characterized in that the electrolyte solution of said electrolyzing step is maintained acidic by addition of excess sulfuric acid thereto.

7. The process of claim 5, further characterized in that the electrolyte solution of said electrolyzing step is maintained acidic by addition of excess sulfuric acid thereto.

References Cited

UNITED STATES PATENTS

| 2,814,360 | 11/1957 | Beaver | 162—29 |
| 3,402,113 | 9/1968 | Tsao | 204—128 |
| 3,236,756 | 2/1966 | Beer | 204—128 |
| 484,990 | 10/1892 | Blackman | 204—128 |

JOHN H. MACK, Primary Examiner

R. L. ANDREWS, Assistant Examiner

U.S. Cl. X.R.

204—130; 162—29